United States Patent [19]

Hazaki et al.

[11] E Patent Number: Re. 33,236

[45] Reissued Date of Patent: Jun. 19, 1990

[54] BEARING DEVICE OF SEALED TYPE SCROLL COMPRESSOR

[75] Inventors: Eiichi Hazaki, Ibaraki; Hiroaki Kuno, Shimizu; Naoshi Uchikawa, Shimizu; Takahiro Tamura, Shimizu; Akira Murayama, Shimizu; Takao Mizuno, Shimizu, all of Japan

[73] Assignee: Hitachi, Ltd., Tokyo, Japan

[21] Appl. No.: 113,914

[22] Filed: Oct. 29, 1987

Related U.S. Patent Documents

Reissue of:

[64] Patent No.: 4,551,082
Issued: Nov. 5, 1985
Appl. No.: 563,040
Filed: Dec. 19, 1983

[30] Foreign Application Priority Data

Dec. 22, 1982 [JP] Japan ..... 57-223770

[51] Int. Cl.[5] ..... F04C 18/04; F04C 29/02

[52] U.S. Cl. ..... 418/55; 418/94

[58] Field of Search ..... 418/55, 94

[56] References Cited

U.S. PATENT DOCUMENTS

| | | | |
|---|---|---|---|
| 3,560,119 | 2/1971 | Busch et al. | 418/55 |
| 4,199,308 | 4/1980 | McCullough | 418/55 |
| 4,396,364 | 8/1983 | Tojo et al. | 418/55 |
| 4,415,318 | 11/1983 | Butterworth | 418/55 |
| 4,462,772 | 7/1984 | Hazaki et al. | 418/55 |

FOREIGN PATENT DOCUMENTS

| | | | |
|---|---|---|---|
| 57-203801 | 12/1982 | Japan | 418/55 |

*Primary Examiner*—John J. Vrablik
*Attorney, Agent, or Firm*—Antonelli, Terry & Wands

[57] ABSTRACT

In a sealed type scroll compressor including an intermediate pressure chamber in which a pressure intermediate in magnitude between a discharge pressure and a suction pressure prevails, a bearing device including a roller bearing and a plain bearing mounted on a frame for supporting a shaft section of a crankshaft. To reduce application of unsymmetrical load to the bearings and prevent an increase in a bearing friction loss, the roller bearing is located in a position close to a crank section of the crankshaft and the plain bearing is located in a position remote from the crank section.

14 Claims, 3 Drawing Sheets

BEARING DEVICE OF SEALED TYPE SCROLL COMPRESSOR

Matter enclosed in heavy brackets [ ] appears in the original patent but forms no part of this reissue specification; matter printed in italics indicates the additions made by reissue.

BACKGROUND OF THE INVENTION

This invention relates to a bearing device of a sealed type scroll compressor.

In a sealed type scroll compressor, an orbiting scroll member is maintained in meshing engagement with a fixed scroll member and driven for orbiting movement with respect to the fixed scroll member by means of a crankshaft without apparently rotating on its own axis, to cause a fluid in a sealed space defined between the two scroll members to perform a pumping action.

In this type of sealed type scroll compressor, the crankshaft includes a crank section engaging the orbiting scroll member and a shaft section supported by a frame. The support structure for the crankshaft can be broadly divided into two types: one type is in the form of plain bearings and the other type is in the form of roller bearings. One example of the support structure of the plain bearing type is described in Japanese Patent Publication No. 76201/82 and comprises a first plain bearing mounted on the orbiting scroll member and engaging the crank section of the crankshaft, and a second plain bearing and a third plain bearing mounted on the frame for supporting the shaft section of the crankshaft. In this type of support structure comprising plain bearings, the crankshaft is tilted by the action of the pressure of a fluid in the sealed space defined between the two scroll members within the range of a gap existing between the crankshaft and the plain bearings and strongly forced against the respective bearings. Thus, the crankshaft has tended to exert on each bearing a force which is not symmetrically applied to each bearing, so that one end of the bearing should bear a higher force than the opposite end, causing an increase in a bearing friction loss. Moreover, the reaction of the oil film provided by the one end of the bearing has not been sufficiently high to avoid wear caused on the bearing and a seizure which occurs in the bearing, and the bearing gap between the plain bearing and the crankshaft has become wedge-shaped in cross section due to the application of unsymmetrical pressure to the bearings. Owing to this phenomenon, the sealed type scroll compressor has suffered the disadvantage that a gaseous refrigerant incorporated in the lubricant stays in the bearing gap of the wedge shape and reduces the viscosity of the lubricant in the bearing gap, thereby causing wear and seizure on the bearing.

SUMMARY OF THE INVENTION

This invention has as its object the provision of a bearing device of a sealed type scroll compressor capable of avoiding an increase in a bearing friction loss and the occurrence of wear and seizure in bearings of the device which might otherwise be caused by the application of unsymmetrical pressure to the bearings.

To accomplish the aforesaid object, the invention provides a sealed type scroll compressor comprising a sealed chamber, a compressor section including a fixed scroll member and an orbiting scroll member located in an upper portion of the sealed chamber, and an electric motor section located in a lower portion of the sealed chamber, a crankshaft including a crank section connected to the orbiting scroll member and a shaft section supported by a frame, and an intermediate pressure chamber defined between the orbiting scroll member and the frame and having a pressure intermediate between a discharge pressure and a suction pressure, wherein a bearing device comprises a roller bearing located on the frame in a position close to the crank section of the crankshaft for supporting the shaft section thereof, and a plain bearing located on the frame in a position remote from the crank section for supporting the shaft section.

Additional and other objects, features and advantages of the invention will be apparent from the description of the preferred embodiments of the invention shown in the accompanying drawings.

DESCRIPTION OF THE PREFERRED EMBODIMENTS

Figure 1:
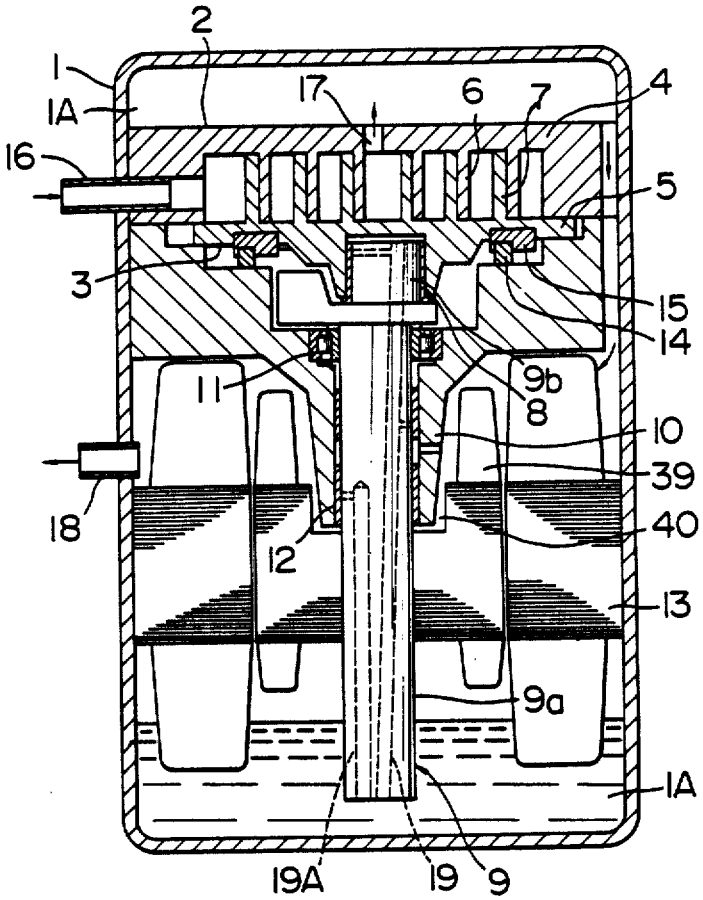
FIG. 1 is a vertical sectional view of a sealed type scroll compressor provided with one embodiment of the bearing device in conformity with the invention.

Preferred embodiments of the invention will now be described by referring to the accompanying drawings. In FIG. 1, there is shown a sealed type scroll compressor having a bearing device of one embodiment of the invention in which a housing 1 defining a chamber 1A therein mounts a fixed scroll member 2 and an orbiting scroll member 3. The fixed scroll member 2 includes a disc-shaped end plate 4 and a wrap 6 of a vortical form located in upstanding position on the end plate 4, and the orbiting scroll member 3 includes a disc-shaped end plate 5 and a wrap 7 of a vortical form located in upstanding position on the end plate 5. The fixed scroll member 2 and orbiting scroll member 3 are maintained in meshing engagement with each other with the respective wraps 6 and 7 facing inwardly toward each other. The orbiting scroll member 3 is provided at its undersurface with a plain bearing 8 with which is engaged a crank section 9b of a crankshaft 9 which is eccentric with respect to a center of a shaft section 9a thereof. The shaft section 9a of the crankshaft 9 is supported at its upper portion by a roller bearing 11 mounted on a frame 10 and at its lower portion by a plain bearing 12 also mounted on the frame 10. The crankshaft 9 is driven for rotation by an electric motor 13. The rotation of the crankshaft 9 causes the orbiting scroll member 3 to move in orbiting movement through an Oldham's ring 14 and an Oldham's key 15, but the orbiting scroll member 3 prevented from rotating on its own axis. The orbiting movement of the orbiting scroll member 3 compresses in a space defined between the fixed scroll member 2 and orbiting scroll member 3 a gaseous refrigerant introduced through a suction pipe 16 into a compressed gas which is discharged through a discharge pipe 18. The compression of the gas sealed in the space between the two scroll members 2 and 3 applies a load through the orbiting scroll member 3, plain bearing 8 and the crank section 9b of the crankshaft 9 to the shaft portion 9a of the crankshaft 9, the load being supported by the roller bearing 11 and plain bearing 12. Formed in the crankshaft 9 are an eccentric feed oil passage 19 which increases its eccentricity with respect to the center of the shaft section 9a in going toward its upper portion, and a feed oil passage 19A perform the function of sucking up an oil from a bottom portion of the chamber 1A by a centrifugal pumping action and feeding same to the bearings 8, 11 and 12.

The detailed construction of each of the bearings 8, 11 and 12 and a structure for feeding an oil thereto will be described by referring to FIG. 2. In the figure, oil is fed as follows to the plain bearing 8 of the orbiting scroll member 3. The oil in the bottom portion of the chamber 1A is drawn by the centrifugal pumping action of the eccentric feed oil passage 19 and fed to an oil chamber 20 defined by an upper end of the crank section 9b of the crankshaft 9, the plain bearing 8 and the orbiting scroll member 3. The oil fed to the oil chamber 20 flows through a feed oil duct 21A communicating with the eccentric feed oil passage 19 and a feed oil groove 21 formed axially on an outer peripheral surface of the crank section 9b of the crankshaft 9, and also flows through a gap between the plain bearing 8 and the crank section 9b, to lubricate the plain bearing 8 and crank section 9b. The oil that has lubricated the plain bearing 8 flows through an annular groove 23 formed in a connection between the crank section 9b of the crankshaft 9 and a balance weight 22 to lubricate a thrust bearing 24 formed integrally with the plain bearing 8 at its lower portion, before being discharged into an intermediate chamber 25 defined between the frame 10 and the orbiting scroll member 3.

To the roller bearing 11 supporting the shaft portion 9a of the crank shaft 9, oil is fed from an oil feeding section 26, 29, 30 which is located midway between a lower end of the roller bearing 11 and an upper end of the plain bearing 12. More specifically, an annular groove 27 is formed in a lower portion of a bush 26 mounted on the frame 10 and oil drawn through the eccentric feed oil passage 19 is led through a feed oil duct 28 communicating with the eccentric feed oil passage 19 to the annular groove 27 from which the oil is fed through a gap between the bush 26 and the shaft section 9a. An axial groove 29 extending upwardly at its upper end from an upper end of the bush 26 is formed on an outer peripheral surface of the shaft section 9a, and oil drawn through the eccentric feed oil passage 19 is led through a feed oil duct 30 communicating with the eccentric feed oil passage 19 to the axial groove 29 for feeding the oil. The oil fed to the annular groove 27 performs the function of providing a seal to the roller bearing 11 against a refrigerant in a lower portion of the chamber 1A which might otherwise enter the roller bearing 11. After lubricating the roller bearing 11, the oil is discharged into the intermediate chamber 25. Part of the oil fed to the bush 26 is discharged from a lower end of the bush 26 into an oil discharge chamber 31 defined by the shaft section 9a, frame 10, roller bearing 11 and plain bearing 12, and thereafter discharged into the chamber 1A through an oil discharge duct 32 formed in the frame 10.

The oil discharged into the intermediate chamber 25 as aforesaid is discharged therefrom through small ducts 33 formed in the end plate 5 of the orbiting scroll member 3 into an interface between the end plates 4 and 5 of the fixed and orbiting scroll members 2 and 3 respectively. Thus, a pressure of a magnitude intermediate between a discharge pressure and a suction pressure prevails in the intermediate chamber 25, and oil is fed to the roller bearing 11 and the plain bearing 8 for the orbiting scroll member 3 by the difference in pressure between the discharge pressure and the suction pressure and the centrifugal pumping action of the eccentric feed oil passage 19.

To feed oil to the lower plain bearing 12 supporting the shaft section 9A of the crankshaft 9, oil drawn through the eccentric feed oil passage 19A is fed to a feed oil duct 34 communicating with the eccentric feed oil passage 19A and an axial groove 35 formed on an outer peripheral surface of the shaft section 8A communicating with the feed oil duct 34. After lubricating the plain bearing 12, the oil is discharged from the upper end of the plain bearing 12 into the chamber 1A through the oil discharge chamber 31 and the oil discharge duct 32.

The axial feed oil grooves 21, 29 and 35 and the feed oil ducts 30 and 34 described hereinabove are located in positions displaced with respect to a direction in which the pressure of the fluid acts as a load in a radial direction on the crankshaft 9.

Operation of the embodiment of the invention of the aforesaid construction will now be described. Upon the motor 13 being actuated, the crankshaft 9 rotates and moves the orbiting scroll member 3 in orbiting movement with respect to the fixed scroll member 2, and a gaseous refrigerant drawn by suction through the suction pipe 16 is discharged through the discharge pipe 18 after being compressed. In this compression stroke, a resultant force P caused by a pressure of the fluid in a sealed space defined between the end plates 4 and 5 of the fixed and orbiting scroll members 2 and 3 is applied, as shown in FIG. 2, to the crank section 9b of the crankshaft 9 through the orbiting scroll member 3 and plain bearing 8. This causes the crankshaft 9 to tilt between the roller bearing 11 and the plain bearing 12. As a result, a load $F_3$ and a load $F_4$ are applied to the roller bearing 11 and the plain bearing 12 respectively. The loads $F_3$ and $F_4$ can be expressed by the following equations:

$$F_3 = \left(1 + \frac{l_3}{l_4}\right)P \tag{1}$$

$$F_4 = \frac{l_3}{l_4}P \tag{2}$$

where $l_3$: the distance between points on which loads P and $F_3$ are applied; and $l_4$: the distance between points on which loads $F_3$ and $F_4$ are applied.

The loads are assumed to be applied to a point located midway between opposite ends of each bearing.

In the prior art, let the distance between the point on the plain bearing for the orbiting scroll member on which a resultant force P is applied and the point on the upper bearing for the shaft section of the crankshaft on which a load is applied be denoted by $l_1$. Let the distance between the point on the upper bearing for the shaft section of the crankshaft on which a load is applied and the point on the lower bearing therefor on which a load is applied be denoted by $l_2$. The distances $l_1$ and $l_2$ in the prior art correspond to the distances $l_3$ and $l_4$ respectively in the invention. Since the roller bearing 11 has a smaller width than the upper plain bearing for the shaft section of the prior art, the distances in the prior art and the invention are related as follows: $l_3 < l_1$, $l_4 > l_2$ and $$\frac{l_3}{l_4} < \frac{l_1}{l_2}.$$

Thus, the loads $F_3$ and $F_4$ acting on the roller bearing 11 and plain bearing 12 according to the invention, respectively, are reduced in magnitude. As a result, a bearing friction loss occurring in these bearings can be miminized. The bearing gap of the roller bearing 11 can be made smaller than the gap between the upper plain bearing for the shaft section of the crankshaft of the prior art and the shaft section, so that the tilting of the crankshaft can be made smaller than the prior art. As a result, the bearing friction loss occurring in the plain bearings 8 and 12 due to the application of unsymmetrical pressure thereto can be reduced. Also, the arrangement whereby the oil feeding section for the roller bearing is located in the center of tilting movement of the shaft section 9a of the crankshaft 9, the tilting movement being caused by the pressure of the fluid produced by the orbiting movement of the orbiting scroll member 3, eliminates wear that might otherwise be caused on the bush 26 and shaft section 9a. Also, the tilting of the crankshaft 9 is small in angle, so that the wear caused on the plain bearing 8 by the unsymmetrical pressure applied thereto can be minimized. As a result, the oil discharged from the roller bearing 11 and the plain bearing 12 can be kept constant in volume, thereby avoiding the trouble that an increase in the volume of the discharged oil with time would increase the agitation loss of the balance weight 22 and a rise in the intermediate pressure would increase the force with which the orbiting scroll member 3 is forced against the fixed scroll member 2 and increase the friction loss of the end plates 4 and 5. Part of the refrigerant is dissolved in the oil in the bottom portion of the chamber 1A due to the pressure of the discharged gas, and the oil has substantially the same temperature as that of the discharged gas. The oil fed to the bush 26 loses its pressure as it flows upwardly and the pressure becomes an intermediate pressure level. As the pressure of the oil drops, the refrigerant in the oil is separated from the oil in a gaseous state. With a drop in the temperature of the oil, the density of the refrigerant dissolved in the oil decreases, so that the oil fed to the roller bearing 11 has its viscosity rise. This increases the thickness of an oil film formed on the roller bearing 11, thereby minimizing wear caused on the plain bearing 8 which receives the highest load of all the loads applied to the three bearings 8, 11 and 12. The load applied to the plain bearing 12 is the lowest load of all the loads applied to the three bearings 8, 11 and 12 and consequently the wear caused on the plain bearing 12 is the least wear of all the wear caused on the three bearings 8, 11 and 12, thereby avoiding an increase in the tilting angle of the crankshaft 9 with time.

Figure 2:
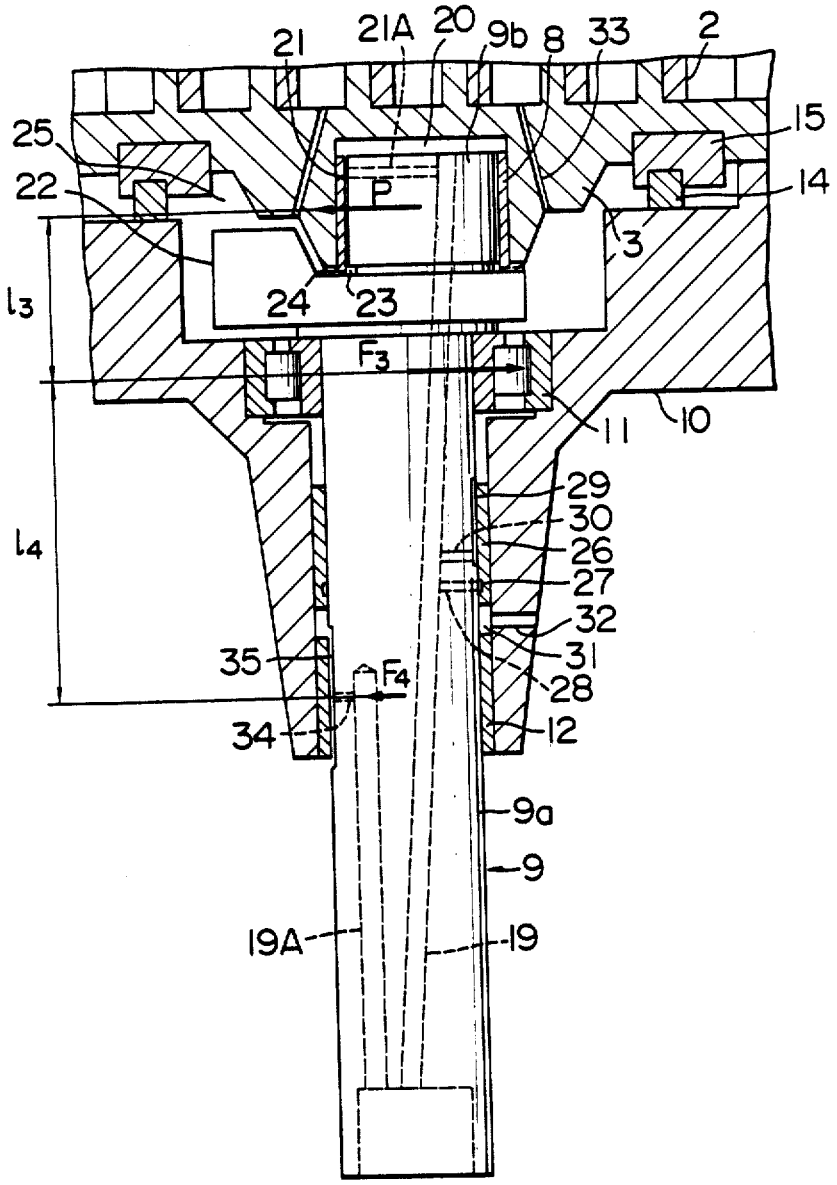
FIG. 2 is a vertical sectional view, on an enlarged scale, of the crankshaft and parts located in its vicinity equipped with the one embodiment of the bearing device in conformity with the invention shown in FIG. 1.
Figure 3:
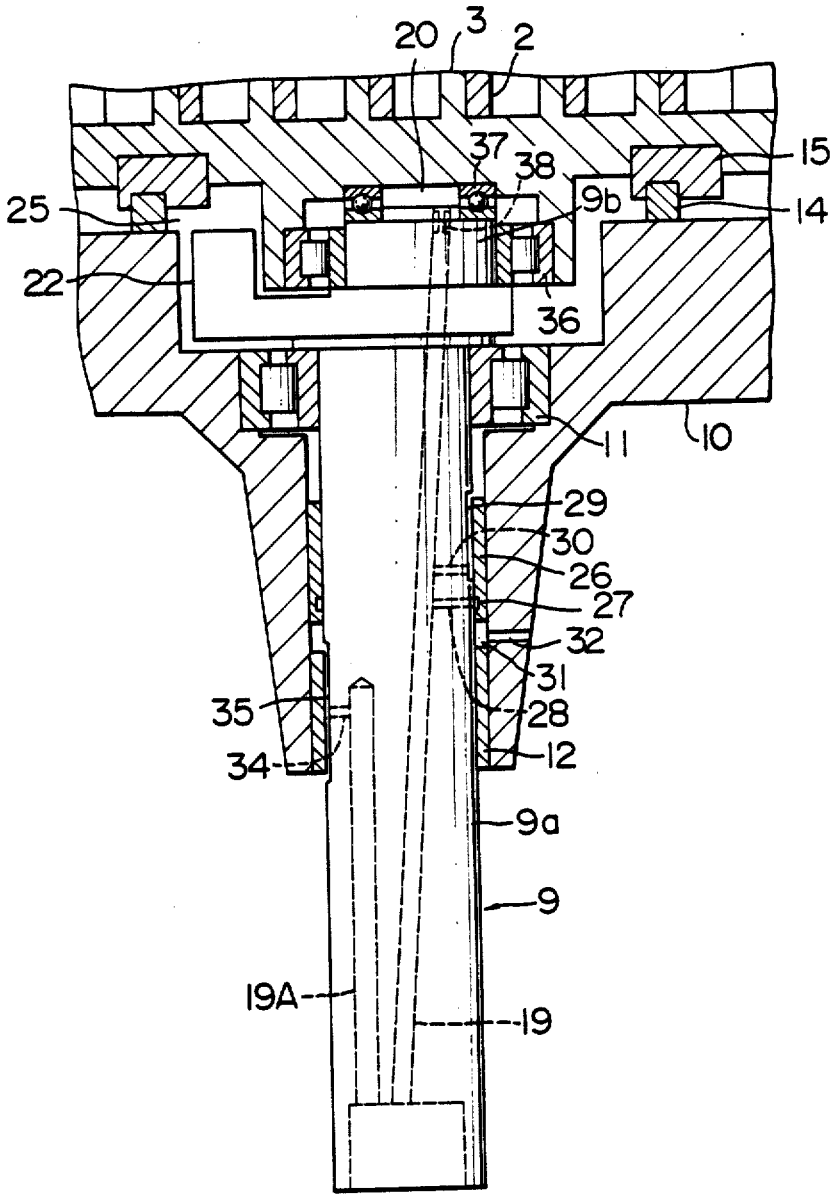
FIG. 3 is a vertical sectional view, on an enlarged scale, of the crankshaft and parts located in its vicinity equipped with another embodiment of the bearing device in conformity with the invention.

FIG. 3 shows the bearing device comprising another embodiment of the invention in which parts similar to those of the embodiment shown in FIGS. 1 and 2 are designated by like reference characters. This embodiment has particular utility in a scroll compressor having a large capacity in which the plain bearing 8 for the orbiting scroll member 3 has a high load P applied thereto and there is the risk that the volume of oil might increase due to wear caused on the plain bearing 8. In this embodiment, a radial roller bearing 36 is mounted between radial portions of the orbiting scroll member 3 and the crank section 9b of the crankshaft 9, and a thrust roller bearing 37 is mounted between upper portions of the orbiting scroll member 3 and the crank section 9b. Oil is fed to the bearings 36 and 37 through the eccentric feed oil passage 19 via a throttle 38 formed at an upper end portion of the passage 19. Thus, the oil chamber 20 above an upper end of the crank section 9b has an intermediate pressure prevailing therein, and a thrust load representing the difference between the discharge pressure and the intermediate pressure acts on the crankshaft 9 from above and is supported by the thrust roller bearing 37. The throttle 38 may be provided by forming a small port in a screw. By this arrangement, the volume of oil discharged from the bearing 37 can be controlled by the throttle 38, enabling a constant volume of oil to be discharged at all times. This eliminates the risk that the volume of the discharged oil would increase with time and the agitation loss of the balance weight 22 and the friction loss of the end plates 4 and 5.

The reason why the plain bearing 12 is used as a lower bearing located at a lower portion of the frame 10 in the embodiments shown in FIGS. 1–3 is as follows. If a roller bearing were used in place of the plain bearing 12, the lower portion of the frame 10 would have to have its diameter increased. This would make it necessary to increase the inner diameter of the counterbore of a rotor of the electric motor 13 or of a coil end in the upper portion of the rotor, thereby causing a reduction in the efficiency of the electric motor 13 and the performance of the scroll compressor.

In the embodiments shown in FIGS. 2 and 3, the annular groove 27 is formed in the bush 26. However, this is not restrictive and it may be formed in the shaft section 9a of the crankshaft 9.

From the foregoing description, it will be appreciated that, according to the invention, it is possible to reduce a load applied to each bearing or unsymmetrical force applied to the bearings, thereby reducing wear caused on the bearing for supporting the orbiting scroll member. Also, the arrangement whereby the oil feeding section for the roller bearing can be mounted in a position in which the occurrence of wear is minimized can achieve the effects that the friction losses of the bearings and the end plates of the scroll members can be minimized and the wear and seizure of the bearings can be avoided.

What is claimed is:

1. In a sealed type scroll compressor comprising:

a sealed chamber;

a compressor section including a fixed scroll member and an orbiting scroll member located in an upper portion of said sealed chamber;

an electric motor section located in a lower portion of said sealed chamber;

a crankshaft including a crank section connected to said orbiting scroll member and a shaft section supported by a frame; and an intermediate pressure chamber defined between the orbiting scroll member and the frame and having a pressure intermediate a discharge pressure and a suction pressure;

a bearing device comprising:

a roller bearing located on the frame in a position close to the crank section of the crankshaft for supporting the shaft section thereof; and a plain bearing located on the frame in a position remote from the crank section for supporting the shaft section and wherein an oil feeding section is provided on the frame between the [ball-and-] roller bearing and the plain bearing for feeding to the [ball-and-] roller bearing oil drawn through an eccentric feed oil passage formed in the crankshaft.

2. A bearing device as claimed in claim 1, further comprising a plain bearing mounted on the orbiting scroll member engaging the crank section of the crankshaft.

3. A bearing device as claimed in claim 2, further comprising an axial groove formed on an outer periphery of the crank section for feeding to said plain bearing on the orbiting scroll member the oil drawn through the eccentric feed oil passage in the crankshaft to perform lubrication.

4. A bearing device as claimed in claim 1, further comprising a radial type roller bearing mounted on the orbiting scroll member engaging the crank section of the crankshaft.

5. A bearing device as claimed in claim 4, further comprising a thrust type roller bearing mounted on the orbiting scroll member engaging the crank section of the crankshaft.

6. A bearing device as claimed in claim 4, further comprising an oil chamber defined above an upper end of the crankshaft for feeding to the bearing on the orbiting scroll member the oil drawn through the eccentric feed oil passage formed in the crankshaft to perform lubrication.

7. A bearing device as claimed in claim 5, further comprising an oil chamber defined above an upper end of the crankshaft for feeding to the bearing on the orbiting scroll member the oil drawn through the eccentric feed oil passage formed in the crankshaft to perform lubrication.

*8. In a sealed type scroll compressor comprising:*

*a sealed chamber;*

*a compressor section including a fixed scroll member and an orbiting scroll member located in said sealed chamber;*

*an electric motor section located in said sealed chamber;*

*a crankshaft including a crank section connected to said orbiting scroll member and a shaft section supported by a frame; and*

*a pressure chamber defined between the orbiting scroll member and the frame and having a pressure therein;*

*a bearing device comprising:*

*a roller bearing located on the frame in a position close to the crank section of the crankshaft for supporting the shaft section thereof; and a*

*plain bearing located on the frame in a position remote from the crank section for supporting the shaft section and wherein an oil feeding section is provided on the frame between the roller bearing and the plain bearing for feeding to the roller bearing oil drawn through a feed oil passage formed in the crankshaft.*

*9. A bearing device as claimed in claim 8, further comprising a plain bearing mounted on the orbiting scroll member engaging the crank section of the crankshaft.*

*10. A bearing device as claimed in claim 9, further comprising an axial groove formed on an outer periphery of the crank section for feeding to said plain bearing on the orbiting scroll member the oil drawn through the feed oil passage in the crankshaft to perform lubrication.*

*11. A bearing device as claimed in claim 8, further comprising a radial type roller bearing mounted on the orbiting scroll member engaging the crank section of the crankshaft.*

*12. A bearing device as claimed in claim 11, further comprising a thrust type roller bearing mounted on the orbiting scroll member engaging the crank section of the crankshaft.*

*13. A bearing device as claimed in claim 11, further comprising an oil chamber defined adjacent to an end of the crankshaft for feeding to the bearing on the orbiting scroll member the oil drawn through the feed oil passage formed in the crankshaft to perform lubrication.*

*14. A bearing device as claimed in claim 12, further comprising an oil chamber defined adjacent to an end of the crankshaft for feeding to the bearing on the orbiting scroll member the oil drawn through the feed oil passage formed in the crankshaft to perform lubrication.*

* * * * *